United States Patent [19]

Cecil

[11] 3,754,712

[45] Aug. 28, 1973

[54] PREPARATION OF STABLE SUSPENSION OF CALCINED CLAY

[75] Inventor: Tom A. Cecil, Highland Park, N.J.

[73] Assignee: Engelhard Minerals & Chemicals Corporation, Woodbridge, N.J.

[22] Filed: Mar. 15, 1972

[21] Appl. No.: 235,019

[52] U.S. Cl. .................................................. 241/16
[51] Int. Cl. ............................................ B02c 19/12
[58] Field of Search ...................... 241/4, 16, 21, 30

[56] References Cited
UNITED STATES PATENTS 3,075,710  1/1963  Feld et al. ............................. 241/16
3,097,801  7/1963  Duke .................................... 241/16

*Primary Examiner*—Granville Y. Custer, Jr.
*Attorney*—Melvin C. Flint et al.

[57] ABSTRACT

Method for forming a fluid, concentrated, aqueous suspension of calcined clay which is stable without adding a colloidal thickening agent. A suspension of the calcined kaolin clay containing a minimal amount of a clay deflocculating agent is subjected to wet-milling during which increments of calcined kaolin clay are added until a fluid concentrated suspension of desired high solids content is produced.

2 Claims, No Drawings

PREPARATION OF STABLE SUSPENSION OF CALCINED CLAY

BACKGROUND OF THE INVENTION

Kaolin clay pigments used by the paper and paint industry are available in both uncalcined (hydrated) and calcined (dehydrated) grades. When preparing aqueous coating or paper filling compositions containing such pigments, it is frequently desirable to provide the clay in the form of a concentrated suspension (slurry) which is sufficiently fluid at both high and low rates of shear to be handled by conventional mixers and pumps.

When the clay is hydrated and has a limited content of particles larger than 2 microns (equivalent spherical diameter), it is relatively simple to produce a stable high solids (70 percent) suspension of the clay. A powerful deflocculant such as tetrasodium pyrophosphate (TSPP) is added to a filter cake of the acid clay, the cake being at about 60 percent solids, and additional dry clay is incorporated with mild agitation until the suspension has the desired high solids content. The TSPP is usually employed in amout within the range of 0.3 percent to 0.5 percent based on the dry clay weight. This corresponds to the use of 6 to 10 lbs. TSPP/ton of clay. Such a suspension is stable in the sense that there is minimal settling of particles to form a dense sediment and minimal formation of a clear or cloudy supernatant liquid layer when the suspension is allowed to stand. This is attributable to the fact that suspension of the fine hydrated clay are fairly viscous and contain only small amounts of coarse particles. Few particles of clay, if any, have sufficient mass to settle under the influence of gravity.

However, when clay pigments contain significant amounts of coarse particles, especially particles larger than 2 microns, and the content of ultrafine particles is low, there is a marked tendency of coarse particles to settle out of deflocculated suspensions of the clay. For example, 70 percent solids deflocculated suspensions of filler grades of hydrated kaolin clay tend to form hard sediments during shipment or storage. These filler clays usually contain at least 20 percent by weight of particles larger than 5 microns and at least 35 percent larger than 2 microns.

Similarly, high solids deflocculated suspensions of calcined clay pigments have particle size distributions similar to those of hydrated filler clays tend to form hard sediments during storage. Furthermore, calcined clay pigments have unusual rheological properties and the problem of producing stable high solids suspensions is even more difficult than when a typical hydrated clay is involved. The calcined form of kaolin clay usually cannot even be prepared into suspensions containing more than 60 percent solids by conventional techniques without producing systems which are highly dilatant. These dilatant systems resemble quicksand. When a ruler is dropped into a fluid concentrated slurry of calcined clay, it may be impossible to extricate the ruler unless the ruler is removed very slowly. The shearing force applied to the suspension results in the conversion of the originally fluid system into a mass which becomes increasingly viscous as the rate of shear increases. Processing equipment such as mixers and pumps would be damaged by such highly dilatant suspensions or the equipment would stop operating.

PRIOR ART

A conventional method for maintaining various particulate solids in suspension in fluid media is to thicken the suspending media with suitable colloidal additives. This principle has been advocated to prevent sedimentation in high solids suspensions of filler grades of clay. In accordance with the teachings of U. S. Pat. No. 3,130,063 to Millman et al., an organic polymeric thickening agent, preferably CMC, is added to a previously deflocculated suspension of coarse filler clay in amount sufficient to thicken (and thereby stabilize) the suspension. However, organic polymers such as CMC are subjected to bacterial degradation. Consequently, clay slurries stabilized with such polymers may arrive at their destination in the form of gray or black masses having a putrid odor. Obviously, it is desirable to avoid stabilizing a deflocculated clay suspension with such thickening agents since preservatives are costly.

It is also well known that calcined kaolin clays tend to produce undesirably viscous aqueous suspensions. It has been suggested (U. S. Pat. No. 3,014,836 to Proctor) to reduce the viscosity of calcined clay by milling the calcined clay under wet or dry conditions. The preferred procedure, as set forth in the Proctor patent, is to deflocculate a 55 percent to 60 percent solids suspension of the calcined clay with a conventional amount of a dispersant (0.3 percent TSPP) and ball mill the suspension for 12 to 24 hours. The slip of ball-milled clay is then flocculated by adding acid or alum. The flocculated calcined clay is subsequently dried and then it is mixed with water and dispersing agent to produce a 70 percent solids suspension. Proctor did not attempt to produce directly the desired 70 percent solids suspensions of calcined clay and he was not concerned with the sedimentation properties of his suspensions.

THE INVENTION

I have discovered a simple method for preparing high solids suspensions of calcined clay which are stable without the necessity for adding a colloidal thickening agent and have minimal dilatancy.

Stated briefly, calcined anhydrous kaolin clay, especially calcined clay containing at least 35 percent by weight of particles coarser than 2 microns, is mixed with water containing a minimal amount of a strong clay dispersant to form a fluid suspension containing less clay than the clay content desired in the high solids slurry product. This fluid suspension is wet milled in the presence of grinding media having a specific gravity above about 3 until the viscosity of the mixture is decreased. Increments of calcined clay are then added, each increment being followed by further wet-milling to reduce the viscosity of the system. The amount of clay in any increment is limited so that the mill will not stop because of the excessively dilatant nature of the mixture undergoing the treatment. The incremental addition of calcined clay is continued until a stable suspension of calcined kaolin clay having a desired high solids content is produced. After all of the calcined clay has been added, the wet-milling is continued until the suspension of clay has sufficiently low viscosity.

From this description it is apparent that one feature of the invention resides in the employment of an extremely small amount of a clay dispersant — typically one-tenth the proportion (relative to clay) that is used in making conventional deflocculated 70 percent clay suspensions. The use of a conventional quantity of clay dispersant with calcined clay would result in excessive dilatancy and the mill would cease operation or it would operate inefficiently.

Another feature resides in the incremental addition of calcined clay to the mill. A suspension containing the level of calcined clay desired in the slurry product could not be wet-milled.

Another feature resides in the use of a milling media having relatively high specific gravity. A lightweight milling medium, such as sand or plastic pellets, would remain suspended in the calcined clay slurry and it would be unable to perform its intended function.

The term "viscosity" as used herein refers to apparent viscosity as determined by the Brookfield viscosity meter at 10 r.p.m. with a No. 3 spindle, unless otherwise indicated.

DETAILED DESCRIPTION

Calacined clays within the scope of the invention include kaolin clay pigments produced by calcination at temperatures within the range of about 1,350° to 2,200°F. Prior to slurry formation, the calcined clay may be blended with minor amounts (e.g., 1 percent to 20 percent based on the weight of the clay) of mineral pigments such as titania, hydrated kaolin clay, calcium carbonate, or mixtures thereof.

Any of the well-known powerful clay dispersants such as alkali metal condensed phosphates, exemplified by tetrapotassium (or tetrasodium) pyrophosphate, sodium citrate, sodium naphthalene formaldehyde condensates exemplified by Tamol 850, may be used as the deflocculating agent. Generally, the dispersant is one which is sufficiently powerful to permit formation of a 70 percent solids fluid slurry of an "LV" grade of No. 1 hydrated kaolin coating clay. In carrying out the present invention, the dispersant is employed in amount within the range of 0.01 percent to 0.1 percent, based on the dry weight of the clay. When appreciably less than about 0.02 percent is used, 70 percent solids suspensions of desired viscosity cannot be prepared. On the other hand, when appreciably more than 0.05 percent dispersant is used, an undesirable hard sediment may form when the high solids slurry of calcined clay is allowed to stand. It will be noted the preferred dispersant level of 0.02 percent to 0.05 percent corresponds to 0.1 to 1.0 lbs. dispersant per ton of clay. As mentioned above, clay dispersants are normally used in proportions corresponding to 6 to 10 lbs./ton.

Calcined clay within the scope of the invention contains from 0 percent to 30 percent by weight of particles larger than 5 microns (e.s.d.) and at least 35 percent larger than 2 microns. I have been unable to produce 70 percent suspensions of ultrafine calcined clay (e.g., calcined clay in which 98 percent is finer than 2 microns and 50 percent is finer than 1 micron) by the method of the invention. In fact, the most concentrated suspensions I produced when subjecting such fine calcined clay to ball milling with incremental addition of clay were only slightly more concentrated than were the suspensions I had prepared using conventional (mild shear) makedown methods.

Excellent results have been obtained by using a conventional ball mill with ceramic milling medium, e.g., "Burundum" as the milling medium. Stainless steel balls may also be employed. Open circuit or closed circuit ball mills may be used.

In putting my invention into practice, the initial slurry is prepared at a calcined clay solids (wt.) level in the range of 50 percent to 65 percent, usually 55 percent to 62 percent. This initial slurry is produced by adding an appropriate quantity of water. The ingredients may be prepared into a slurry before adding them to the mill or they may be charged separately to the mill. If the solids content of the charge to the mill is too high, the mill will fail to operate after a short time because of the dilatant nature of the calcined clay. Provided the initial slurry is sufficiently dilute for the mill to operate, the clay will be reduced in viscosity as the milling proceeds. After the initial charge is reduced in viscosity, more calcined clay is added to the mill. The procedure is repeated as described more fully in the following illustrative examples until the slurry in the mill has the desired solids content. After all of the calcined clay has been added, the mill is operated, usually for at least an hour, to reduce the viscosity of the final clay charge to a value below 1,000 cp. Generally, total milling times are within the range of 3 to 10 hours, more usually in the range of 5 to 8 hours. Milling times in excess of the upper limit of the preferred range may be economically prohibitive and result in no added benefit. On the other hand, when milling time is appreciably less than 5 hours, it may not be possible to build up the solids of the charge to the desired high level.

After the wet milling has been completed, the milling medium is separated from the suspension of calcined clay. The suspension may be centrifuged and the overflow removed and recovered. The sediment (e.g., particles larger than 5 microns) may be discarded or it may be recirculated to the grinding mill. The removal of sediment would be impossible if the novel high solids slurries of calcined clay were dilatant since the slurries would thicken excessively during the centrifuging operation.

The starting clay used in the following illustrative examples was a commercial undispersed (acid) calcined clay pigment supplied as "Satintone No. 1." This pigment had the following particle size distribution as determined by the conventional Casagrande sedimentation procedure: 94 percent minus 10 microns; 79 percent minus 5 microns; 54 percent minus 2 microns; 30 percent minus 1 micron. Average particle size (50 percent) was 1.7 microns. Oil absorption was 46 g./100 g. by the ASTM (rub out) method and 59 g./100 g. by the Gardner Coleman method.

Attempts were made to prepare the "Satintone No. 1" into a fluid stable suspension containing 60 percent solids or higher by the prior art method of stirring the clay with mild agitation into a solution of TSPP dispersant (6 lbs./ton) and then stabilizing the suspension by thickening it with small amounts of sodium carboxymethyl cellulose or other organic thickeners. Even with carboxymethyl cellulose or other organic thickeners present as the stabilizer, excessive sedimentation took place when suspensions containing 60 percent solids were stored. Satisfactory suspensions containing appreciably more than 60 percent solids could not be prepared by the technique of Millman et al (supra). These suspensions were either too viscous and dilatant for practical handling and use or excessive sedimentation took place.

In accordance with this invention, a stable 70.5 percent solids suspension of the "Satintone No. 1" was prepared from the following:

| | |
|---|---|
| Satintone No. 1 | 1000.0 gm. |
| Water | 428 gm. |
| Tetrasodium pyrophosphate | 0.3 gm. |

A 700 gm. charge of Satintone No. 1 was placed in a porcelain ball mill, 8 inches in diameter and 6 inches long (inside dimensions). The mill contained a 5,000 gm. charge of a 50/50 (wt.) mixture of 13/16 × 13/16 inch and ½ × ½ inch "Burundum" cylinders. Burundum is described in the Proctor patent (supra). The tetrasodium pyrophosphate (0.3 gm.) previously dissolved in the water (428 gm.) was added to the mill. The mill was started up at a speed of 76 r.p.m. with the charge at about 62 percent solids. After 1 hour and 23 minutes had passed, 100 gm. of Satintone was added while the mill was turning. Another 100 gm. was added after another hour had passed. After the mill had operated for another hour and a half, 100 gm. more of the Satintone (the balance of the 1,000 gm. charge) was added. The mill was operated for three and one-half hours (total milling time 7 hours) and the clay suspension was discharged from the ball mill. The suspension had an acceptable Brookfield viscosity (No. 3 spindle) of 140 cp. at 10 r.p.m. and 108 cp. at 100 r.p.m. Solds as determined by a moisture balance was 70.5 percent.

To evaluate stability, a portion of the 70.5 percent slurry was placed in a 500 ml. settling cylinder and allowed to stand for 8 days. Stability was evaluated by comparing the sedimentation properties with those of a 70 percent solids slurry of predispersed No. 2 hydrated kaolin clay ("HT") produced in conventional manner. A stable slurry was defined as one in which the volume of sediment and the volume of supernatant liquid after standing 8 days were no greater than the corresponding volume in the "HT" slurry. More specifically, a slurry was evaluated as being adequately stable for practical use if the supernatant liquid volume was 10 ml. (2 percent of total volume) or less and sediment volume was 15 ml. (3 percent of total volume) or less, provided also that the sediment was soft, loose and easily flowable. A sediment was described as being hard if it could not be poured out of a settling cylinder without using a water spray.

A 70.5 percent solids slurry of calcined clay produced by the 7 hour ball mill treatment as described above resulted in a loose sediment of 10 ml. and a 5 ml. cloudy supernatant. This compared favorably with the volumes of sediment and supernatant of the control (HT) slurry. Apparent viscosity (Brookfield No. 3 spindle) of the slurry of calcined clay was 100 cp. at 10 r.p.m. and 96 cp. at 100 r.p.m. Dilatancy was minimal.

It was also found that the particle size of the calcined clay had decreased slightly during ball milling. It will be recalled that the starting clay was 21 percent plus 5 microns and 54 percent minus 2 microns. After ball milling the clay product was 18 percent coarser than 5 microns and 58 percent minus 2 microns. Oil absorption had decreased to 26 g./100 g. (ASTM) or 36 g./100 g. (Gardner Coleman).

Tests were then carried out to compare the results of the method of the present invention with the results obtained by combining the prior art suggestion of the Proctor patent (supra) to ball mill calcined kaolin to reduce its viscosity with the prior art suggestion of the Millman et al patent to stabilize suspensions of clay having a particle size similar to Satintone No. 1 by adding organic thickening agents.

To accomplish this, 0.3 gm. TSPP was dissolved in 428 gm. water. This minimal quantity of dispersant was selected in order to minimize dilatancy and thereby avoid damaging the mill. 700 gm. Satintone No. 1 was charged to the ball mill with the dispersant solution and the mixture was ball milled for 2 hours. The suspension was thickened with CMC to stabilize it since excessive sedimentation took place in the absence of the thickener. The resulting 62 percent solids suspension was no more stable than the 70.5 percent solids suspension produced when carrying out the process of the present invention.

I claim:

1. A method for producing a concentrated, stable fluid slurry of a calcined kaolin clay pigment which comprises providing a fluid suspension of said calcined clay in water containing a clay dispersant in amount less than 0.1 percent by weight of the calcined clay, wet milling said suspension in the presence of grinding media having a specific gravity above 3 until the viscosity of the clay is reduced sufficiently to permit the addition of more clay without stopping the mill, adding more calcined clay in increments while continuing the wet milling after such incremental additions until a stable suspension having desired concentration of calcined clay is produced, and continuing the wet milling until the viscosity of the suspension is reduced.

2. A method for producing a stable concentrated suspension of a calcined kaolin clay pigment containing at least 35 percent by weight of particles larger than 2 microns which comprises slurrying said clay in water containing a condensed phosphate salt dispersant in amount within the range of 0.01 percent to 0.1 percent based on the weight of clay in a 70 percent solids suspension, sufficient clay being present in the slurry to produce a fluid suspension containing about 55 percent to 62 percent clay solids, ball milling the resulting slurry with ceramic milling media having a specific gravity above 3 until the viscosity of the suspension is reduced, adding increments of calcined clay, each increment being followed by further ball milling, until the resulting slurry has a clay solids content of about 70 percent and ball milling the slurry after all of the clay has been added until a suspension having desired viscosity is obtained.

* * * * *